Nov. 21, 1967   G. BIEZUNSKI ETAL   3,353,711
DEVICE FOR THE MIXING OF LIQUIDS
Filed Jan. 27, 1965   3 Sheets-Sheet 3

INVENTORS
George Biezunski,
Jacques Maugest &
Robert Péres
BY Edwin E. Greigg
ATTORNEY United States Patent Office 3,353,711
Patented Nov. 21, 1967

3,353,711
DEVICE FOR THE MIXING OF LIQUIDS
Georges Biezunski, Chaville, Jacques Maugest, Paris, and Robert Peres, Neuilly-sur-Seine, France, assignors to Compagnie Generale d'Automatisme, Societe Octel, and Compagnie d'Applications et Recherches Atomiques, all of Paris, France
Filed Jan. 27, 1965, Ser. No. 428,510
Claims priority, application France, Jan. 31, 1964, 962,261; Dec. 23, 1964, 999,808
31 Claims. (Cl. 222—28)

The object of the present invention is a self-acting apparatus allowing to mix one or several liquids with a liquid flowing within a pipe, and especially the continuous mixings, in determined proportions, additives such as tetra-ethyl-lead, tetra-methyl-lead or more generally alkyl-lead, to mineral-oil products.

One knows that the octane index of the gasolines may be changed by adding anti-knock agents such as alkyl-lead, the amount of which is very small compared to the quantity of treated gasoline.

Until now the above cited mixing was effected in separated operations and the homogenisation of the treated products was obtained in storage tanks. The known devices allowing to obtain the continuous mixing i.e. during the flowing of the gasoline, are uneasily utilizable precisely when the flow of alkyl-lead is of very low values. The errors made by these devices are very important with respect to the proportionality ratio which must be kept to the more strictly possible. On the other hand, the alkyl-leads are toxic components which necessitate for the installation, strict conditions of tightness and the products of their decomposition are susceptible to cause bad working of the mechanical parts in action.

The present invention allows to remedy to those drawbacks. Its object is a device carrying out automatically the continuous mixing in a predetermined proportionality ratio of several products, especially of alkyl-lead to mineral-oil products more particularly remarkable by the fact that said proportionality is obtained by regulation of the alkyl-lead flow by the mineral-oil products flow through entirely electronic means.

According to another characteristic of the invention the alkyl-lead, or the product in small proportion, is contained within at least two tubes which are alternately emptying into the piping delivering the other fluid.

Advantageously, said tubes are put into communication with said piping through the intermediary of groups of associated valves the opening and closing controls of which are caused by the respective positions of the alkyl-lead level in said tubes.

Other advantages and characteristics will appear from the following description, given merely as illustrative examples of two methods of embodiment of the invention. The description will now be given with reference to the acompanying drawing wherein.

Figure 1:
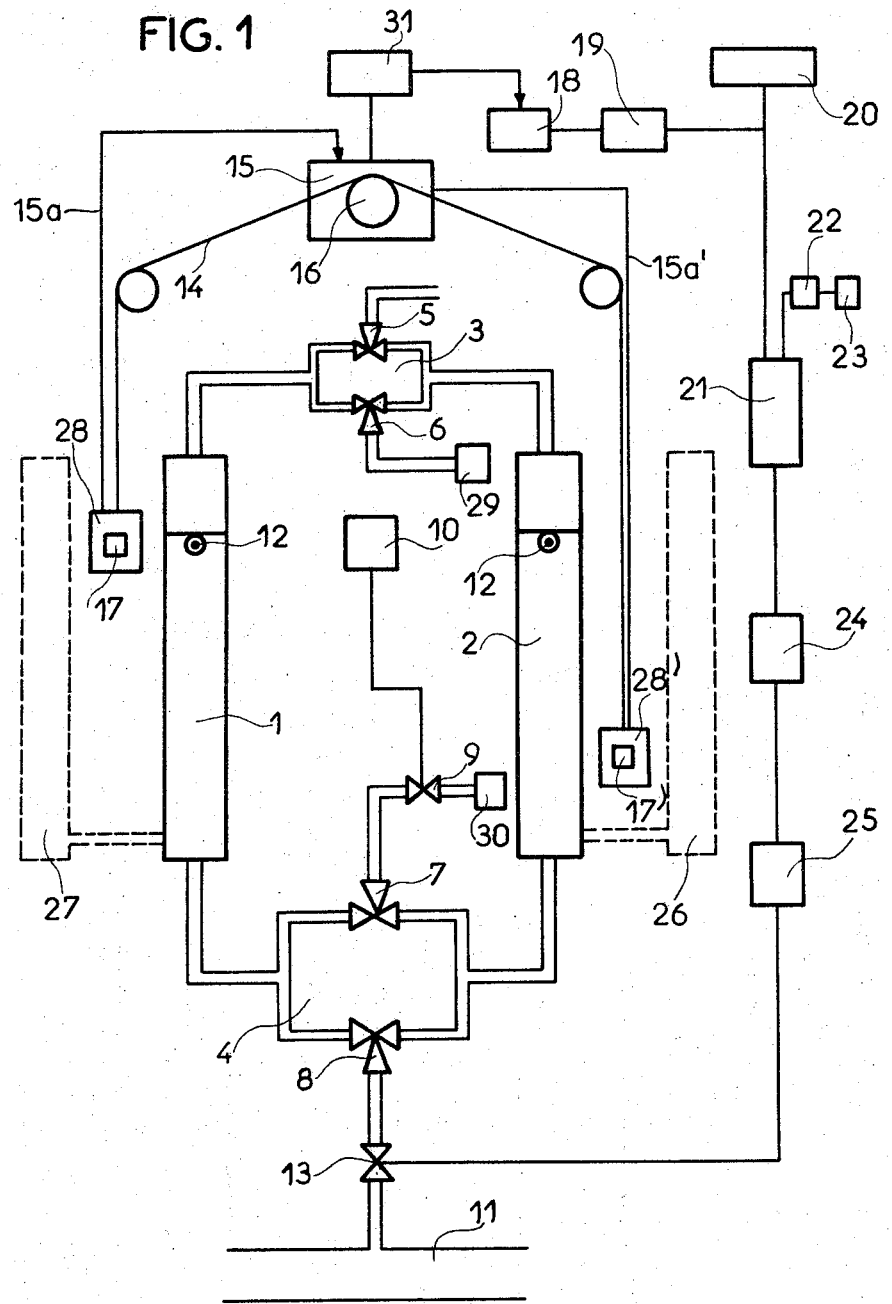
FIG. 1 is a schematic representation of a first embodiment of the invention.

In FIGURE 1, the device according to the invention comprises two tubes 1 and 2 in which is let the alkyl-lead in such a manner that one of these tubes would be filled while the other is emptying into the gasoline piping. The filling of the tubes can advantageously be operated under vacuum, but the system can also operate in the same conditions if the liquid is sucked in or if the filling is obtained only by gravity. The filling and emptying device of the tubes 1 and 2 is constituted by two groups of three-path valves 3 and 4.

Group 3 comprises two three-path valves 5 and 6 which allow to create vacuum into one of the tube when the other is put to the atmosphere, and reciprocally through connection with the evacuated enclosure 29 and respectively the atmosphere.

The three-path valves 7 and 8 of group 4 allow the filling of one tube while the other is emptying and reciprocally. Valve 9 which is situated between the three-path valve 7 and the storage tank 30, allows to stop the filling of the tube at a well determined level under the action of a level detector 10.

Valve 8 connects alternately the tubes 1 and 2 to the gasoline piping 11 through the intermediary of an electropneumatic valve 13 controlled by a regulating device according to the invention. Valve 13 puts into communication one tube, 1 or 2, with the piping 11 in which flows the gasoline to be treated.

Each tube 1 and 2 comprises a level gauge 12 (12') the reason of which is to ensure the continuous measuring of the liquids levels in said tubes. These level gauges are of a type called "gamma rays gauge," the principle of which resting on the variations of ionization of a detecting chamber according to the relative position of both the radioactive source and said chamber., Each of these gauges comprises a radioactive source for instance, constituted of cobalt 60 or cesium 137 sealed into a float 12 (12') placed on the surface of the liquid contained within the tubes 1 and 2. On the external face of each tube wall a guiding and servo-controlling set, not shown on the figure, permits to a detector box 28 (28') to move and consequently to follow faithfully the liquid level. The two detector boxes 28, 28' are mechanically connected by a chain 14 driven by a motor 15 through a pinion 16. Each of the detector boxes 28, 28' encloses essentially a double ionization chamber 17 (17') associated to a built in amplifier-transformer apparatus.

Figure 3:
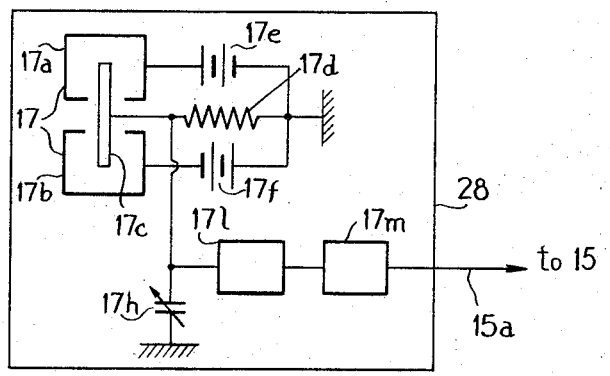
FIG. 3 is a schematic representation of the detector 28 of FIGS. 1 and 2.
Figure 4:
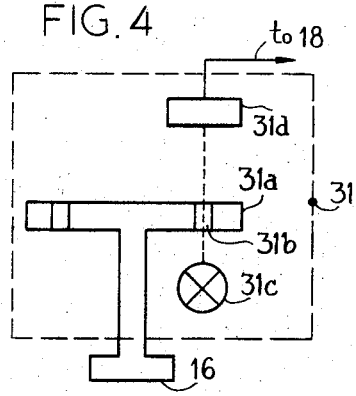
FIG. 4 is a representation of a coding device used in the invention.

As illustrated in FIG. 3, a double ionization chamber, for example 17, is constituted by two cylindrical identical members 17a and 17b located side by side and housing a collecting central electrode 17c connected to the earth through a resistor 17d. One of the cylinders 17a is brought to a positive voltage 17e, the other 17b to an equal negative voltage 17f, so that the ionization currents circulating within the collecting electrode 17c are of opposed polarity. The differential current thus collected is cut by a vibrating condenser 17h, amplified in 17e into the form of an output alternating current the phase of which is representative of the direction of the distance apart between the source 12 and the ionization chamber 17 within box 28, said current being used in combination with phase detector 17m for the control of the servo-motor 15. The motor is of the diphase type and can be provided with one or several reducers allowing, on the one hand to ensure the stability of the control loop 28–15a or 28'–15'a and, on the other hand to obtain the necessary torque for the driving of the boxes 28 (28'). The motor 15 comprises also a device 31 delivering pulses the number of which is proportional to the rotation angle of the pinion 16. As illustrated in FIG. 4, this device can for instance be constituted of a disk 31a, integral with the driving axis of pinion 16; provided on its periphery of holes 31b regularly spaced out. A luminous beam 31c is directed onto the disk and is received on the other side of the disk 31a by a set of photodiodes 31d so that, each time a hole lets the luminous beam pass through, a pulse is emitted by the excited photodiode 31d.

These pulses are put into form in a device 18 and then sent into a numerical transformer 19, the part of which is to translate into the required unities the pulses emitted by the device 31. The number of pulses, being proportional to the shifting of the float 12, is then equally proportional to the quantity of the liquid flown out of the emptying tube into the piping 11 where flows the gasoline. The transformer 19 allows the expression of this quantity in litres or in any other desirable unit. The adding machine 20, which can advantageously be of the numerical display type, allows one to know the total injected amount of alkyl-lead.

Figure 5:
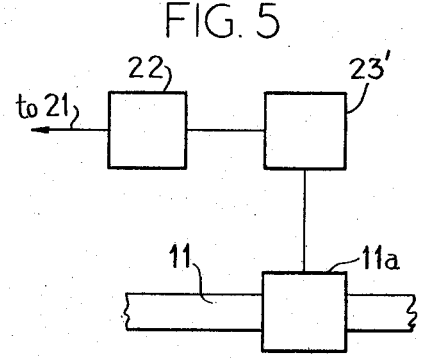
FIG. 5 is a representation of a portion of the circuit useful in the embodiments of the invention in FIGS. 1 and 2.

The pulses expressed in units are thereafter sent into a numerical comparator 21 with two inputs which receives also on its other input balanced orders representing the predetermined coefficient of proportionality binding the injected alkyl-lead quantity to the quantity of gasoline delivered in the piping 11. These orders reach the comparator 21 under the form of pulses emitted by a pilot oscillator 23 and are treated in a multiplier 22 the multiplication factor of which is equal to the above cited proportionality coefficient. The comparison between the signals representing on one hand the quantity of injected liquid (signals emitted by the device 31) and the quantity of liquid to inject (signals emitted by the set oscillator 23-multiplier 22) causes the emission of orders determining, according to the direction of the difference between said signals, the degree of opening or of closing of valve 13, for example an electropneumatic valve, through the intermediary of a regulator 24 for example of the proportional-integral-differential type, in short "PID," and of an electropneumatic transformer 25 converting the electric quantity given by the regulator 24 into air-pressure. As hereinbelow discussed and as further shown in the embodiment of FIG. 5, oscillator 23 can be replaced by a pulse generator 23', the frequency of which is proportional to the flow measured by a conventional flowmeter 11a in the piping 11.

The operation of the device is the following:

The tube 1 being supposed filled and the desired proportionality factor being displayed on the multiplier 22, the piping 11 begins to deliver gasoline.

The four three-path valves 5, 6, 7 and 8 are in the following positions:

5 puts the emptying tube 1 in communication with the atmosphere;

6 puts under vacuum the refilling tube 2 by connection with the enclosure 29;

7 connects the tube 2 with the storage tank 30 through valve 9;

8 connects the tube 1 to the gasoline piping through valve 13.

The gasoline flowing within the piping 11 when valve 13 is still closed, the comparator 21 detects a difference between the quantity of alkyl-lead to inject and the injected quantity of the same liquid which is still zero. This divergence determines thus the opening of valve 13. The liquid level in the tube 1 goes down and thus the ionization chamber 17 situated in front of the tube 1 begins to follow the source 12. The differential current emitted by the double ionization chamber 17 situated in front of the emptying tube, causes the rotation of pinion 16 driven by the motor of the servo-mechanism 15 completing the tracking control of the radio-active source contained in the float 12. The injected quantity of liquid is measured at each moment by the number of pulses emitted by the device 31 cooperating with the servo-mechanism 15. This quantity is also compared, at each moment, to the quantity to inject, the divergence between the two causing the opening or the closing of valve 13.

Simultaneously the tube 2 is refilling under the effect of the vacuum created within this tube. This filling is effected more rapidly than the emptying of tube 1 and when the source 12 reaches a well determined level, the detector 10 emits an order causing the closing of valve 9 and the tube 2 is then waiting to be emptied. When tube 1 is empty the ionization chamber 17 relating to said tube causes the motor 15 to rotate in the opposite direction. The ionization chamber 17' relating to tube 2 goes up again until it is in the same horizontal plane as the float 12 indicating the alkyl-lead level within the tube 2. The valves 5, 6, 7 and 8 reverse then and the mixing is achieved from the tube 2 while occurs the refilling of tube 1 in the same way as it has just been described.

The maximum flow of injected liquid depends on the maximum speed tracking of the sources 12 by the ionization chambers 17 (17') and also on the diameter of tubes 1 and 2. If, for determined dimensions of the tubes 1 and 2 one wishes to increase the flow it is possible to add to the device other tubes such as 26 and 27 communicating directly and respectively with the tubes 2 and 1. The device working is then identical to the one which has been described above, except for the flow of alkyl-lead which is more important.

Figure 2:
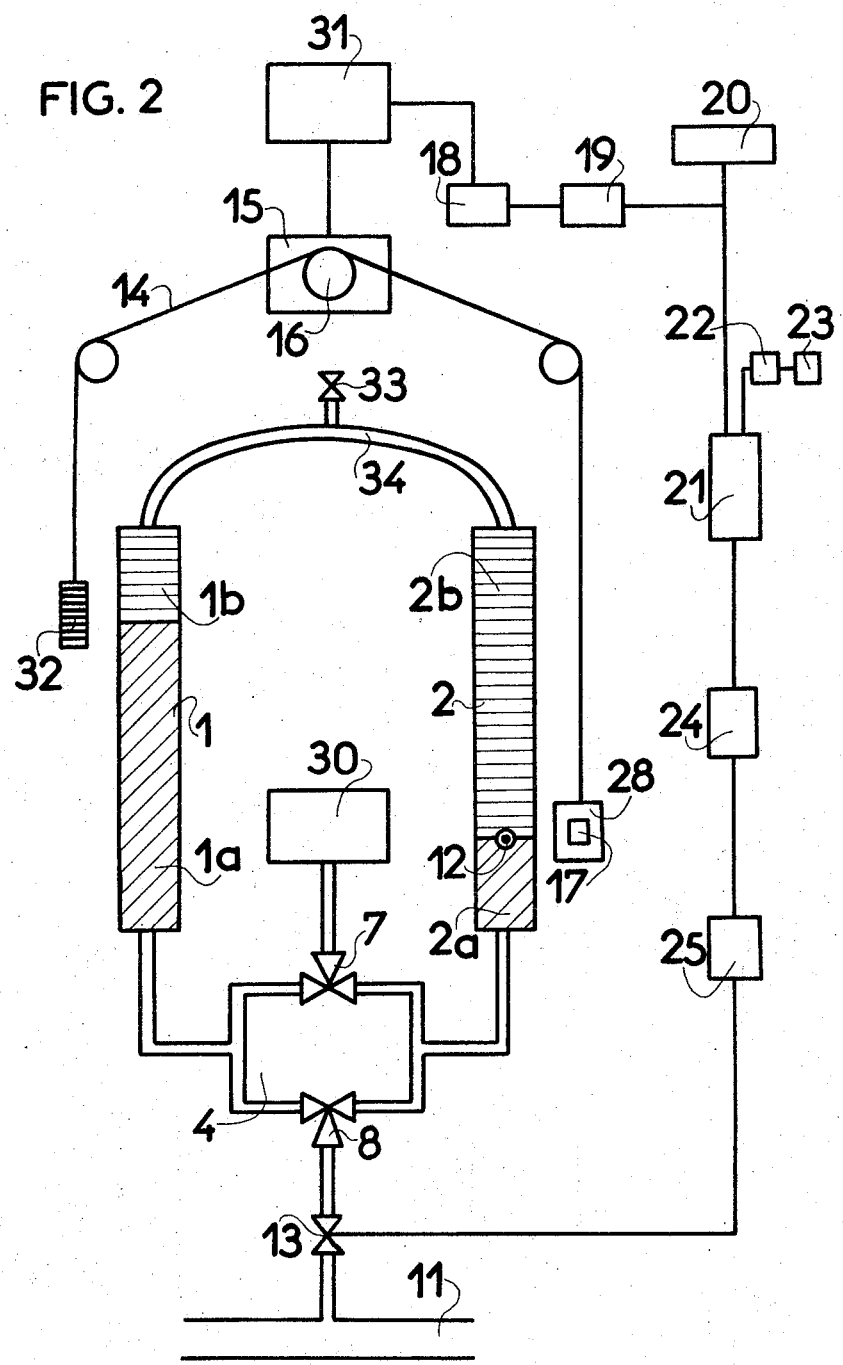
FIG. 2 is a schematic representation of a second embodiment of the invention.

In the FIGURE 2, the references have the same meaning as in FIGURE 1. The installation according to FIGURE 2 comprises a tube 1 during its refilling with the additive contained in the tank 30. 4 is a shunt comprising pipes and two three-path valves 7 and 8. The additive passes from the loading tank in the lower part 1a of the tube 1 through the valve 7. During the same time the additive contained in the lower part 2a of a tube 2 is flowing into a main piping 11 where flows the main product through the intermediary of valve 8.

The upper part 1b of tube 1 and the upper part 2b of tube 2, as well as a duct 34 connecting these two parts, are full of a liquid nonmiscible with the liquid filling the parts 1a and 2a: for example water, if the parts 1a and 2a are filled with alkyl-lead. The adding of the nonmiscible liquid is made through valve 33.

On the interface between part 2a and part 2b floats a small tube 12 containing a radioactive source, for example Co 60 or Cs 137.

A box 28 comprising a double ionization chamber 17, connected by a chain 14 to a counter-balance weight 32 is tied to maintain its axis in the level of the float 12, under the action of an error signal given by the double ionization chamber 17 when its axis is not alined on the float. This error signal, amplified, acts upon a motor 15 which drives the chain 14 through the intermediary of pinion 16. At the same time the motor 15 rotates a photoelectric pulses generator disk (analog-numerical transformer) 31, these pulses passing through a former 18, through a pulse-litre transformer 19, into an adding-machine 20. On another hand, as further shown in FIG. 5, a pilot oscilaltor 23' has its frequency regulated according to the flow within the piping 11, either by manual regulation or through the intermediary of a flow metering pick up 11a inserted into the piping 11. A multiplier 22 allows to display the desired proportion between the flow within the piping 11 and the additive flow.

The regulation of the additive flow is made through a comparator 21 and a regulator preferentially of the type "PID" 24 which acts, for example, through the intermediary of an electropneumatic transformer 25, upon an injection regulating valve 13 for example pneumatically controlled.

Figure 6:
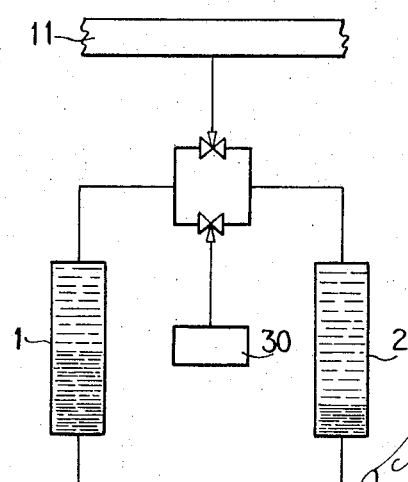
FIG. 6 is a representation of yet another embodiment of the invention.

In the present method of embodiment the filling and the emptying are effected by the bottom of the tubes with a connecting duct at the top. It is also possible, within the scope of the invention to perform the emptying and the refilling by the top with connecting ducts at the bottom as illustrated in FIG. 6. In these two cases the level in both tubes change in opposite directions.

One can bring other variants or modifications to the above described method of embodiment only given as an illustrative example without departing from the scope of the invention.

What we claim is:
1. An apparatus for admixing of an additive liquid to a liquid product flowing in a pipeline comprising:
supply means, operable to supply said additive liquid,
a first and a second auxiliary substantially cylindrical container, a part of at least one of said containers being filled with said additive fluid,
a first conduit means connecting one end of said first container to one end of said second container, a constant quantity of a non-corrosive fluid substantially incompressible and immiscible with said additive liquid contained in an occupying the space within said conduit and the remaining space within said first and second containers for transmitting pressure forces from one to the other of said containers,
further conduit means joining said supply means, the other end of the first and second containers and said pipeline to a valve means, said valve means alternately openable to two positions, one of said positions connecting said other end of the first container to said supply means while operatively connecting said other end of the second container to said pipeline and the other of said two positions connecting said other end of said first container to said pipeline while operatively connecting said other end of said second container to said supply means.

2. An apparatus according to claim 1 comprising a controllable valve inserted in said conduit means joining said pipeline to said valve means, and operating in combination with a regulation control circuit including a first measuring means which is sensitive to the flow rate of the medium circulating in the circuit formed by said containers and conduit means.

3. Apparatus according to claim 2 comprising a second measuring means sensitive to the flow rate of said liquid product flowing through said pipeline and connected to said regulation circuit, said circuit further comprising comparator means for comparing the flow rates of said medium and with the flow rate of said liquid product thereby regulating the proportion of said additive liquid admixed to said liquid product.

4. Apparatus according to claim 1 wherein said additive liquid has a higher specific weight than said non-corrosive fluid, said one ends of said first and second containers being bottom ends, said other ends being top ends.

5. Apparatus according to claim 1 wherein said additive liquid has a higher specific weight than said non-corrosive fluid, said one end of said first and second containers being the top ends, said other ends being bottom ends.

6. Apparatus according to claim 5 wherein said additive liquid is water.

7. Apparatus according to claim 1 wherein said supply means are operable to supply said additive liquid under pressure.

8. Apparatus according to claim 7 wherein said supply means comprises a container located at a higher level than that of said auxiliary containers, the pressure being created by gravity.

9. An apparatus for admixing of an additive liquid to a liquid product flowing in a pipeline comprising:
supply means, operable to supply said additive liquid,
a first and a second auxiliary substantially cylindrical container, a part of at least one of said containers being filled with said additive fluid,
a first conduit means connecting one end of said first container to one end of said second container, said conduit means and the free volume of said containers being filled with a constant quantity of a non-corrosive fluid substantially incompressible and immiscible with said additive liquid, for transmitting pressure forces from one to the other of said containers,
a plurality of further conduit means comprising valve means and forming a controllable distribution circuit interconnecting a second end of said first and second containers, said supply means and said pipeline, said distribution circuit being operable to alternately connect one of said second ends to said supply means and the other of said second ends to said pipeline,
and a controllable valve inserted in said distribution circuit upstream from said pipeline, and operating in combination with a regulation control circuit including a first measuring means which is sensitive to the flow rate of the medium circulating in the circuit formed by said containers and conduit means, said first measuring means including pulse-coding means, said regulation control circuit further comprising comparator means having one input connected to said pulse-coding means, a second input connected to reference pulse generator means and and output operatively connected with the control circuit of a valve means inserted in a conduit connecting said controllable distribution circuit with said pipeline.

10. Apparatus according to claim 9 wherein said reference pulse generator means comprises a fixed frequency pulse generator connected to the input of a controllable ratio frequency multiplier, the multiplication ratio of said multiplier being representative of the desired flow-rate of said additive liquid admixed to said pipeline.

11. Apparatus according to claim 10 wherein said reference pulse generator means is a pulse coding device connected to flow measuring device inserted in said pipeline upstream from said conduit connecting the pipeline to the distribution circuit.

12. Apparatus according to claim 9 wherein said fixed frequency pulse generator is connected to said second input of said comparator means through a frequency controllable ratio frequency multiplier means, the ratio of said multiplier means being representative of the desired flow rate of said additive liquid admixed to said pipeline.

13. An apparatus for admixing of an additive liquid to a liquid product flowing in a pipeline comprising:
supply means, operable to supply said additive liquid,
a first and a second auxiliary substantially cylindrical container, a part of at least one of said containers being filled with said additive fluid,
a first conduit means connecting one end of said first container to one end of said second container, said conduit means and the free volume of said containers being filled with a constant quantity of a non-corrosive fluid substantially incompressible and immiscible with said additive liquid, for transmitting pressure forces from one to the other of said containers,
a plurality of further conduit means comprising valve means and forming a controllable distribution circuit interconnecting a second end of said first and second containers, said supply means and said pipeline, said distribution circuit being operable to alternately connect one of said second ends to said supply means and the other of said second ends to said pipeline,
and a controllable valve inserted in said distribution circuit upstream from said pipeline and operatively connected to a regulation and control circuit comprising a first measuring means which is sensitive to the flow rate of the liquid medium circulating in the circuit formed by said containers and conduit means, said first measuring means comprising a radiation source floating on the separation surface of the two immiscible liquids in one of said two containers and associated with a movable radiation detection means along said one of said containers in combination with a motor controlled by said detection means, the rotation speed of said motor being representative of the rate of flow of said corrosive liquid in said controllable valve.

14. Apparatus according to claim 13 comprising a second measuring means sensitive to the rate of flow of said liquid product circulating in said pipeline, said regulation and control circuit further comprising a comparator having one input terminal connected to the output of said first measuring means and a second input terminal connected to the output of said second measuring means, the output of said comparator being operatively connected to said controllable valve so as to control said valve by comparison of the measures given by said measuring means.

15. Apparatus according to claim 14 in which said two measuring means comprise coding means for transforming the measures into pulses the frequency of which reflect the measured flow rates, said comparator being a frequency comparator.

16. Apparatus for admixing an additive liquid with a liquid product circulating in a conduit means said apparatus comprising:
  means for continuously supplying additive liquid comprising two containers and means, in cooperation with a controllable valve, for placing said containers alternately in communication with said conduit means,
  means, for measuring the rate of flow of said additive liquid, comprising a float containing a radiation source, placed on the surface of said additive liquid in one of said containers, a means for detecting radiation emitted by said source cooperating with said source and movable by means of a motor controlled by said detection means, said measuring means furthermore comprising a tachometric coding means connected to the shaft of said motor, the signal given by said coding means being representative of the rate of flow of said liquid as it flows through said controllable valve.

17. Apparatus according to claim 16 in which said radiation source is a source of cobalt 60.

18. Apparatus according to claim 16 in which said means of detection of the radiation emitted by said source comprises two ionization chambers, each containing a collector electrode, said electrodes being connected to one end of a load resistor the other end of which is connected to said chambers, respectively, by means of two voltage sources connected in the opposite direction, the voltage at the terminals of said resistor reflecting the difference in level between said detection means and said radiation source.

19. Apparatus according to claim 18 in which said collector electrodes form a single electrode common to both chambers.

20. Apparatus according to claim 19 comprising a regulation circuit with input terminals connected to the terminals of said resistor and output terminals connected to the control circuit of said motor.

21. Apparatus according to claim 16 in which said detection means is kept in place at the same horizontal level as the source by a mechanical connection means driven by the shaft of said motors.

22. Apparatus according to claim 20 in which said regulation circuit comprises a vibrating capacitor for modulating said voltage at the terminals of said load resistor, the electrodes of said capacitor forming said input terminals of said regulation circuit and being connected to both the input terminals of an AC amplifier so as to deliver a control signal to said motor, thus enabling said radiation detector to be moved so as to keep it at the same horizontal level as radiation source.

23. Apparatus according to claim 16 in which said tachometric coding means comprises a photoelectric generator controlled in combination with an apertured disc the apertures thereof passing in front of a source of light, said disc being turned by said motor shaft, thus causing pulses to be generated the number of which is proportional to the speed of rotation of said motor.

24. Apparatus according to claim 23 comprising a converter connected to the output of said tachometric coding means in order to transform the signal constituted by said pulses into a signal expressing a corresponding magnitude in units of volume.

25. Apparatus according to claim 24 comprising an adding member connected to the output of said converter in order to indicate the total volume of additive liquid injected into said conduit.

26. Apparatus according to claim 16 further comprising a regulation circuit, said circuit comprising a comparator having a first input terminal connected to a reference frequency generator, and a second input terminal connected to the output of said tachometric coding means, the output of said comparator being connected to said controllable valve to control the rate of flow of the additive liquid as a function of said reference frequency value.

27. Apparatus according to claim 26 in which said reference frequency generator comprises a pilot oscillator connected to an adjustable multiplication ratio frequency multiplier.

28. Apparatus according to claim 24 comprising a signal comparator having a first input connected to the output of said converter, and a second input connected to a frequency signal generator reflecting the rate of flow of said liquid product in said conduit, the output of said comparator being operatively connected to said controllable valve in order to control the rate of flow of the additive liquid as a function of the rate of flow of said liquid product.

29. Apparatus according to claim 28 in which the controllable valve is pneumatically controlled and connected to the output of said comparator by means of an electropneumatic converter member capable of transforming an electrical output magnitude into a control pressure.

30. Apparatus according to claim 16 in which said means of measuring the rate of flow of said additive liquid comprises a second float containing a second radiation source, placed on the surface of said corrosive liquid in the other of said containers, a second radiation detection means combined with said second source and movable along said second container by mechanical means connecting said second detection means to said first detection means.

31. Apparatus according to claim 30 comprising a third radiation detection means, placed at a predetermined level with regard to said containers and a operatively connected to a valve for controlling the closing of a conduit joining one of the containers to a container supplying additive liquid when the additive liquid in one of said containers has reached a predetermined level.

References Cited
UNITED STATES PATENTS

| | | | |
|---|---|---|---|
| 916,130 | 3/1909 | Evans | 222—395 |
| 925,012 | 6/1909 | Moore | 103—235 X |
| 1,286,972 | 12/1918 | Farr | 222—395 |
| 1,363,284 | 12/1920 | Smithers | 137—160 |
| 1,536,054 | 5/1925 | Bartlett. | |
| 1,665,093 | 4/1928 | Gouvion | 222—67 |
| 1,849,856 | 3/1932 | Trost | 222—63 X |
| 2,075,678 | 3/1937 | Von Langen | 222—328 X |
| 2,636,642 | 4/1953 | Gorin | 222—58 |
| 2,669,941 | 2/1954 | Stafford | 222—373 X |
| 2,714,167 | 7/1955 | Herzog | 250—43.5 |
| 2,895,450 | 7/1959 | Hope | 103—236 X |
| 2,905,361 | 9/1959 | Noall | 222—137 X |
| 2,909,769 | 10/1959 | Spaulding | 340—149 X |
| 2,968,720 | 1/1961 | Hull | 250—43.4 |
| 3,038,638 | 6/1962 | Notter | 222—26 |

RAPHAEL M. LUPO, *Primary Examiner.*

UNITED STATES PATENT OFFICE
CERTIFICATE OF CORRECTION

Patent No. 3,353,711　　　　　　　　　　　　November 21, 1967

Georges Biezunski et al.

It is hereby certified that error appears in the above numbered patent requiring correction and that the said Letters Patent should read as corrected below.

Column 4, line 52, for "oscilaltor" read -- oscillator --; column 5, line 53, after "liquid" insert -- is alkyl lead and said non-corrosive fluid --; column 8, line 50, strike out "a".

Signed and sealed this 10th day of December 1968.

(SEAL)
Attest:

Edward M. Fletcher, Jr.　　　　　　　　　　　EDWARD J. BRENNER
Attesting Officer　　　　　　　　　　　　　　Commissioner of Patents